(12) United States Patent
Jeon et al.

(10) Patent No.: US 8,913,315 B2
(45) Date of Patent: Dec. 16, 2014

(54) TERAHERTZ BAND FILTER

(75) Inventors: Tae In Jeon, Busan (KR); Eui Su Lee, Busan (KR)

(73) Assignee: Korea Maritime University Industry-Academic Cooperation Foundation (KR)

( * ) Notice: Subject to any disclaimer, the term of this patent is extended or adjusted under 35 U.S.C. 154(b) by 113 days.

(21) Appl. No.: 13/334,604

(22) Filed: Dec. 22, 2011

(65) Prior Publication Data
US 2013/0107356 A1    May 2, 2013

(30) Foreign Application Priority Data

Oct. 26, 2011   (KR) .................. 10-2011-0110145

(51) Int. Cl.
G02B 5/20      (2006.01)
G02B 6/293     (2006.01)

(52) U.S. Cl.
CPC ............ *G02B 5/204* (2013.01); *G02B 5/208* (2013.01); *G02B 6/29389* (2013.01)
USPC ..................................... 359/360; 333/202

(58) Field of Classification Search
CPC ............... H07P 1/10–1/28; H01P 7/08–7/088
USPC ......... 359/232, 360, 577–578, 585, 589, 885, 359/886, 385–390, 656–661, 719–721, 726, 359/728, 732, 738, 739, 741; 333/202, 205, 333/208, 209, 211, 212; 250/216, 234, 306, 250/307; 369/112.23–112.26, 13.33; 977/826, 868, 874, 943
See application file for complete search history.

(56) References Cited

U.S. PATENT DOCUMENTS

| | | | | |
|---|---|---|---|---|
| 3,916,352 | A * | 10/1975 | Powell | 333/211 |
| 3,995,238 | A * | 11/1976 | Knox et al. | 333/21 R |
| 4,060,778 | A * | 11/1977 | Hefni et al. | 333/211 |
| 4,873,501 | A * | 10/1989 | Hislop | 333/208 |
| 4,897,623 | A * | 1/1990 | Reindel | 333/208 |
| 5,004,993 | A * | 4/1991 | Reindel | 333/208 |
| 6,356,168 | B1 * | 3/2002 | Barnett et al. | 333/202 |
| 6,392,508 | B1 * | 5/2002 | Damphousse et al. | 333/209 |
| 2011/0084783 | A1 * | 4/2011 | Jinnai | 333/209 |

FOREIGN PATENT DOCUMENTS

KR         101039126 B1     6/2011

OTHER PUBLICATIONS

Eui Su Lee, et al. "Terahertz notch and low-pass filters based on band gaps properties by using metal slits in tapered parallel-plate waveguides," Aug. 1, 2011, Optics Express, vol. 19, No. 16, p. 14852-14859.*
Eui Su Lee, et al. "Terahertz band gap properties by using metal slits in tapered parallel-plate waveguides," Nov. 5, 2010, Applied Physics Letter, vol. 97, 181112.*

(Continued)

*Primary Examiner* — Stephone B Allen
*Assistant Examiner* — Jeffrey Madonna

(57) ABSTRACT

A terahertz band filter for filtering, in a frequency band, a terahertz wave propagating between a pair of metal plates with an upper parallel surface facing a lower parallel surface includes a sheet parallel to the upper and lower parallel surfaces, which is disposed between the metal plates and is spaced apart therefrom, and at least one slit located in the sheet to face the upper and lower parallel surfaces, wherein the sheet comprises a single slit to function as a notch filter for blocking in a specific frequency band.

9 Claims, 8 Drawing Sheets

(56) References Cited

OTHER PUBLICATIONS

Eui Su Lee et al., "THz stop bands by using Metal Slits in Tapered Parallel-Plate Waveguide," Lasers and Elecro-Optics Europe Conference on and 12th European Quantum Electronics, May 2011.

Sang Hoon Kim et al., "Propagation of THz Field through a Tapered Parallel-plate Waveguide," 2010 IEEE.

Eui-Su Lee, "Propagation Properties of Terahertz radiation Through a metal parallel-plate waveguide," Master's Thesis, Korea Maritime and Ocean University, Dec. 2008.

* cited by examiner

| Region | I | II | III | IV | V | VI | VII |
|---|---|---|---|---|---|---|---|
| Period P[μm] | 170 | 150 | 140 | 130 | 120 | 110 | 100 |
| Width w[μm] | 60 | | | | | | |
| Number of Slits N[ea] | 10 | | | | | | |

TERAHERTZ BAND FILTER

CROSS-REFERENCE TO RELATED APPLICATION

This application claims priority to Korean Patent Application No. 10-2011-0110145 filed on Oct. 26, 2011 and all the benefits accruing therefrom under 35 U.S.C. §119, the contents of which are incorporated by reference in their entirety.

BACKGROUND

The present disclosure relates to a terahertz band filter, and more particularly, to a terahertz notch filter for blocking a terahertz wave in a specific band, and a terahertz low pass filter for passing a terahertz wave in a low frequency band.

Terahertz waves are electromagnetic waves in a near infrared region between microwaves and light waves. Such a terahertz wave has a frequency ranging from approximately 0.1 THz to approximately 10 THz, a wavelength ranging from approximately 0.03 mm to approximately 3 mm, and an energy ranging from approximately 0.4 meV to approximately 40 meV. Since the production and detection of terahertz waves as electromagnetic waves were technically limited, they were unexplored. However, as a femtosecond laser is developed as a light source for terahertz waves, the production and detection of terahertz waves are possible, and active research on terahertz bands is recently carried out on a global scale.

Since terahertz bands are between a microwave band and a light wave band, terahertz waves have both the rectilinear propagation of light and the transmissivity of electromagnetic waves, and easily pass through a material that blocks a microwave or light wave. In addition, terahertz waves are easily absorbed into moisture. Accordingly, terahertz waves are applied to various fields such as medicine, medical engineering, biochemistry, food technology, pollution watching, and security inspection, and their importance increases. Furthermore, terahertz waves are applied to various types of application technology such as nanotechnology, information technology, bio technology, environmental technology, space technology, and military technology. To this end, the development of passive devices such as terahertz waveguides, filters, and resonators is required.

Especially, the development of terahertz waveguides is required for local transmission between boards of integrated circuits, and transmission between devices. Recently, tapered parallel plate waveguides (TPPWGs), circular metal waveguides, rectangular metal waveguides, single crystal sapphire fibers, transmission lines, single metal wires, coaxial cables, and parallel-plate waveguides are introduced, which are passive devices adapted for a single mode propagation in a terahertz region.

FIG. 1 is a perspective view illustrating tapered parallel plate waveguides in the related art.

Referring to FIG. 1, tapered parallel plate waveguides include a pair of metal plates 11 and 12 which are opposed to each other to form parallel surfaces 11$a$ and 12$a$ along which a terahertz wave propagates. An input end 10$a$ and an output end 10$b$ are integrated into the metal plates 11 and 12 forming the parallel surfaces 11$a$ and 12$a$. The input end 10$a$ and the output end 10$b$ include pairs of slopes 11$b$ and 12$b$ that gradually decrease in distance therebetween until reaching a distance between the parallel surfaces 11$a$ and 12$a$. That is, each of the metal plates 11 and 12 includes the parallel surface 11$a$ or 12$a$ and the slopes 11$b$ or 12$b$ disposed at ends thereof and inclined from the parallel surface 11$a$ or 12$a$, and the metal plates 11 and 12 are coupled to each other to face each other with a space therebetween, to thereby form tapered parallel plate waveguides 1 to which the input end 10$a$ and the output end 10$b$ are integrated. Accordingly, inclination angles of the tapered parallel plate waveguides 1 including the slopes 11$b$ and 12$b$ at the ends thereof improve coupling efficiency, and make it possible to propagate terahertz waveforms in a practical transverse electro magnetic (TEM) mode.

Although practical TEM mode propagation through tapered parallel plate waveguides (TPPWGs) is realized, a resonant cavity on a surface of an optical waveguide, a photonic crystal, and the like are continually researched. Especially, filtering (notch filtering or low pass filtering) within a specific band is needed in terahertz wave propagation. Since filters for filtering within a specific band in terahertz wave propagation as described above (hereinafter, referred to as terahertz band filters) are variously applied to terahertz communications, and the research and development of sensors and devices, their development is urgently needed.

PRIOR ART DOCUMENT

Patent Document 1

Korean Patent Registration No. 10-1039126

SUMMARY

The present disclosure provides a terahertz notch filter for blocking a terahertz wave only in a specific frequency band. The present disclosure also provides a terahertz low pass filter for passing a terahertz wave only in a low frequency band. The present disclosure also provides a structure for varying a stop frequency band of a terahertz notch filter.

In accordance with an exemplary embodiment, a terahertz band filter for filtering, in a frequency band, a terahertz wave propagating between a pair of metal plates with an upper parallel surface facing a lower parallel surface includes: a sheet parallel to the upper and lower parallel surfaces, which is disposed between the metal plates and is spaced apart therefrom; and at least one slit located in the sheet to face the upper and lower parallel surfaces.

The metal plates may include one of an input end and an output end, and the input end and the output end may include slopes that gradually decrease in distance therebetween until reaching ends of the upper and lower parallel surfaces.

The sheet may have a protrusion length to the input and output ends including the slopes. The slit may extend in a direction perpendicular to a longitudinal direction of the sheet.

The sheet may include a single slit to function as a notch filter for blocking in a specific frequency band.

An air gap as a distance between the parallel surface and the sheet may be varied to control a resonant frequency of a notch filter. A refractive index of a medium between the upper and lower parallel surfaces may be varied to control a resonant frequency of a notch filter. A length and a width of the slit may be varied to control a resonant frequency of a notch filter.

A plurality of slits having the same width may be located with constant periods in the sheet to face the upper and lower parallel surfaces and function as a low pass filter.

The slits may be classified into groups according to the periods, and the groups may be arrayed in a longitudinal direction of the sheet, and the periods of the groups may be different from each other.

BRIEF DESCRIPTION OF THE DRAWINGS

Exemplary embodiments can be understood in more detail from the following description taken in conjunction with the accompanying drawings, in which:

FIGS. 8A, 8B, and 8C are views illustrating slits formed in a sheet and FDTD simulation results in accordance with an exemplary embodiment;

DETAILED DESCRIPTION OF EXEMPLARY EMBODIMENTS

Figure 1:
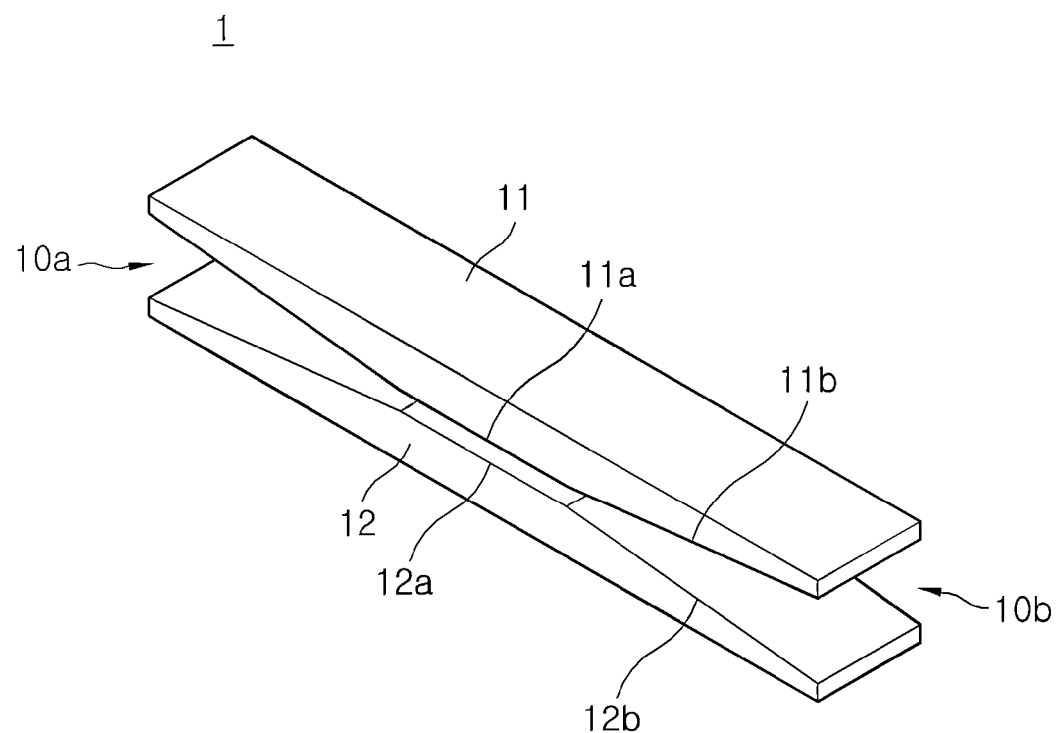
FIG. 1 is a perspective view illustrating tapered parallel plate waveguides in the related art.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals denote like elements throughout.

Hereinafter, a terahertz band filter is a frequency band filter for propagating a terahertz wave between a pair of metal plates with upper and lower parallel surfaces that face each other. Structures of a terahertz notch filter and a terahertz low pass filter, as a terahertz band filter, are described in accordance with the following embodiments.

Figure 2:
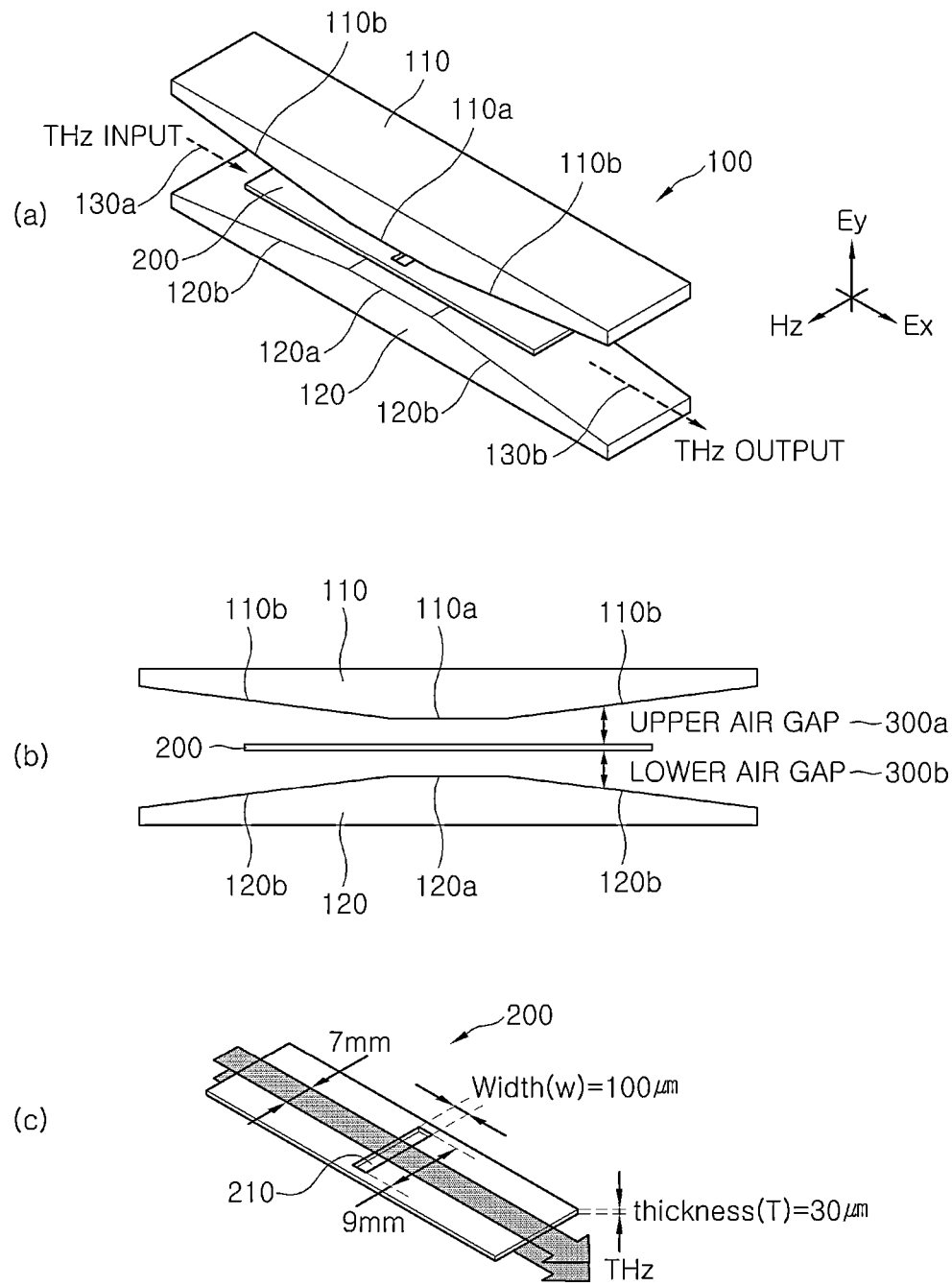
FIGS. 2A, 2B and 2C are views illustrating tapered parallel plate waveguides including a terahertz notch filter in accordance with an exemplary embodiment.

FIG. 2A is a perspective view illustrating tapered parallel plate waveguides including a terahertz notch filter in accordance with an exemplary embodiment. FIG. 2B is a side view illustrating the tapered parallel plate waveguides of FIG. 2A. FIG. 2C is a perspective view illustrating the terahertz notch filter of FIG. 2A.

Tapered parallel plate waveguides (TPPWGs) 100 in accordance with the current embodiment include a pair of metal plates 110 and 120 which face each other to form parallel surfaces 110a and 120a along which a terahertz wave propagates. An input end 130a and an output end 130b are integrated into the metal plates 110 and 120 forming the parallel surfaces 110a and 120a. The input end 130a and the output end 130b include pairs of slopes 110b and 120b that gradually decrease in distance therebetween until reaching a distance between the parallel surfaces 110a and 120a. That is, each of the metal plates 110 and 120 includes the parallel surface 110a or 120a and the slopes 110b or 120b disposed at ends thereof and inclined from the parallel surface 110a or 120a, and the metal plates 110 and 120 are coupled to each other to face each other with a space therebetween, to thereby form the tapered parallel plate waveguides 100 to which the input end 130a and the output end 130b are integrated. The borders between the parallel surface 110a and the slopes 110b, and the borders between the parallel surface 120a and the slopes 120b are round, and the angle therebetween may range from about approximately 0° to approximately 10°. The metal plates 110 and 120 may be formed of any material for propagating a terahertz wave, such as aluminum.

Since the input end 130a collecting terahertz waves and the output end 130b emitting the terahertz waves have a tapered structure, inclination angles of the tapered parallel plate waveguides 100 improve coupling efficiency, and a terahertz waveform can practically propagate through the tapered parallel plate waveguides 100.

The tapered parallel plate waveguides 100 include a terahertz notch filter. When terahertz waves propagate through the tapered parallel plate waveguides 100, the terahertz notch filter quickly attenuates a terahertz wave in a specific frequency band (narrow frequency band) to block the terahertz wave. Hereinafter, the terahertz notch filter is a band reject filter that quickly attenuates a terahertz wave in a specific frequency band (narrow frequency band) when terahertz waves propagate through a waveguide.

The terahertz notch filter includes: a sheet 200 parallel to the parallel surfaces 110a and 120a, which is disposed between the metal plates 110 and 120 and is spaced apart therefrom; and a single slit 210 disposed in the sheet 200 to correspond to the parallel surfaces 110a and 120a.

The sheet 200 is formed of a metal to propagate a beam. The sheet 200 may be formed of stainless steel having high conductivity.

The sheet 200 is disposed between the parallel surfaces 110a and 120a, and protrudes toward the input end 130a and the output end 130b. Thus, a terahertz wave introduced through the input end 130a is, before arriving at the parallel surfaces 110a and 120a, divided into a wave introduced to an upper air gap 300a between the sheet 200 and the upper parallel surface 110a and a wave introduced to a lower air gap 300b between the sheet 200 and the lower parallel surface 120a.

The slit 210 disposed in the sheet 200 extends in a direction Hz perpendicular to a direction Ex that is the longitudinal direction of the sheet 200, and is formed using micro-photo-chemical etching. The single slit 210 of the terahertz notch filter is used to block a terahertz wave in a specific frequency band. The single slit 210 is located to face the center of the parallel surfaces 110a and 120a. A resonant frequency band of terahertz waves propagating from the input end 130a to the output end 130b is filtered out according to a resonant frequency of the terahertz waves passing through the single slit 210.

The filtered resonant frequency band of the terahertz waves may vary according to variables, that is, according to an air gap, a refractive index, a slit thickness, a slit width.

i) An air gap, as a variable changing a resonant frequency band, will now be described.

The filtered resonant frequency band varies according to the size of an air gap as a distance between one parallel surface 110a or 120a and the sheet 200. That is, a propagation path length of a terahertz wave passing between a parallel surface and a sheet varies according to the size of an air gap as a medium gap between the parallel surface and the sheet, and thus, a resonant frequency band thereof varies. For reference, the sheet 200 may be disposed in the middle between the parallel surfaces 110a and 120a, and be parallel thereto. Alternatively, the sheet 200 may be disposed in an asymmetrical portion between the parallel surfaces 110a and 120a, and be parallel thereto.

ii) A refractive index, as a variable changing a resonant frequency band, will now be described.

The filtered resonant frequency band of terahertz waves may vary according to a refractive index as well as an air gap. A medium such as air, or gases having various refractive indices may be present between a pair of metal plates. The filtered resonant frequency band of terahertz waves passing between the metal plates may vary with the refractive indices.

iii) A slit thickness and a slit width, as variables changing a resonant frequency band, will now be described.

The propagation path length of a terahertz wave passing between a parallel surface and a sheet varies with the thickness and width of a slit between metal plates, like with an air gap, and thus, the resonant frequency band thereof varies.

Dimensions of the slit 210 of the terahertz notch filter are as follows.

The slit 210 has a thickness of approximately 30 μm, a width of approximately 100 μm, and a length of approximately 9 mm. A propagated terahertz beam has a width of approximately 7 mm. The ratio of the thickness of the slit 210 to the width thereof may be varied.

The width of the propagated terahertz beam is a relative value, and is smaller than the length of the slit 210. That is, the length of the slit 210 is designed to be greater than the width of the propagated terahertz beam. When the length of the slit 210 is significantly great, the width of the propagated terahertz beam is not limited. On the contrary, when the width of the propagated terahertz beam is significantly smaller than the length of the slit 210, the length of the slit 210 is not limited.

Figure 3:
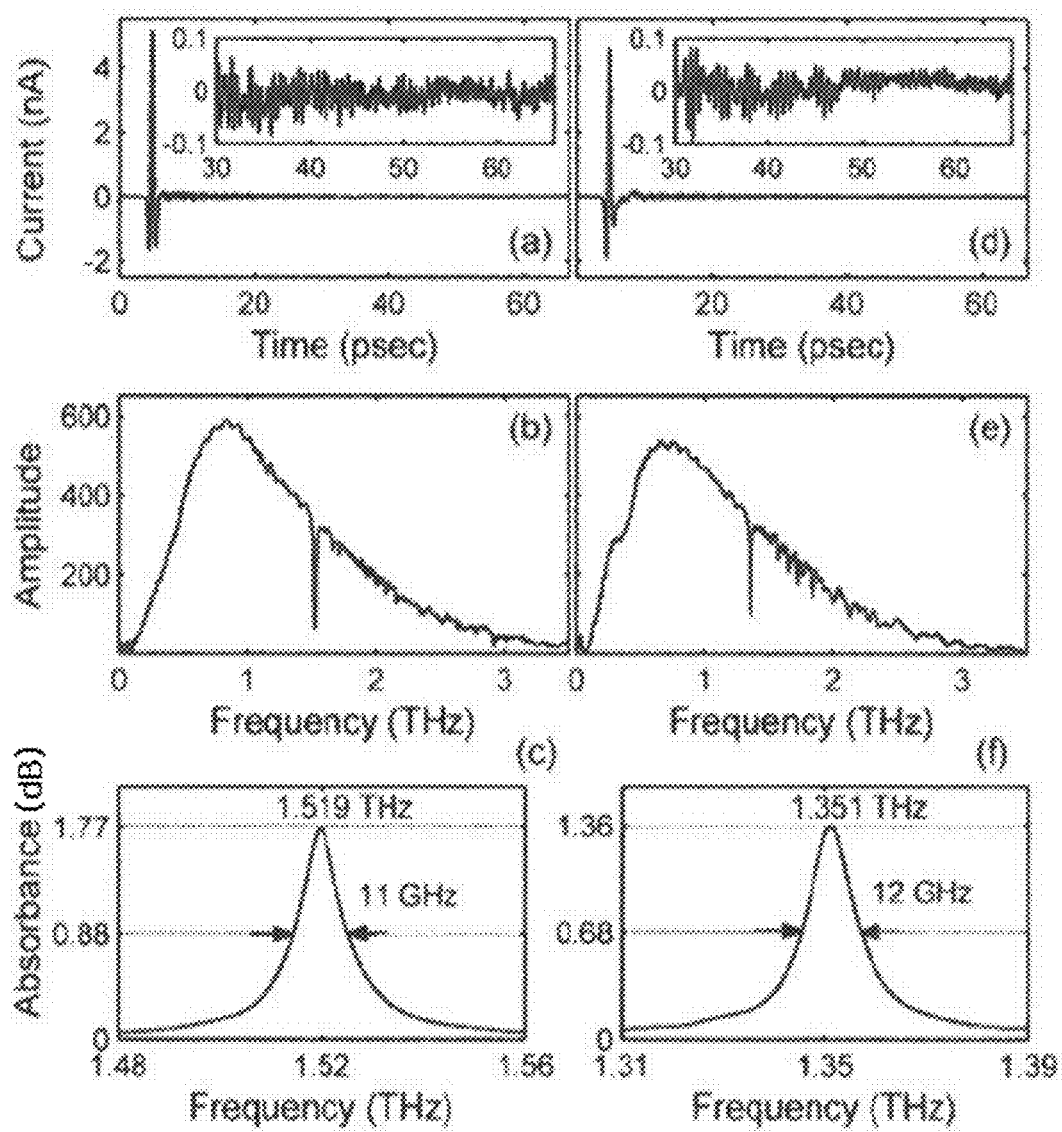
FIGS. 3A to 3F are graphs illustrating tunable properties of a terahertz notch filter in accordance with an exemplary embodiment.

Hereinafter, experimental results of terahertz pulses and spectrums according to air gaps of a terahertz notch filter will now be described with reference to FIG. 3.

An experiment is performed with a propagated terahertz beam having a width of approximately 7 mm, a parallel surface having a length of approximately 9 mm, a sheet having an entire length of approximately 96 mm and a thickness of approximately 30 μm, and a single slit having a width of approximately 100 μm. A terahertz beam, having a y-direction perpendicular to an xz surface of a waveguide, is generated in a TM mode, and is gradually confined through an input end in a tapered region of the waveguide. The sheet having an entire length of approximately 96 mm is formed of stainless steel as a metal, and protrudes approximately 43.5 mm toward the input end in the tapered region, and an output end. The slit has a thickness of approximately 30 μm, a width of approximately 100 μm, and a length of approximately 9 mm. The propagated terahertz beam has a width of approximately 7 mm as described above. The ratio of the thickness of the slit to the width thereof may be varied.

FIGS. 3A to 3F are graphs illustrating tunable properties of a terahertz notch filter in accordance with an exemplary embodiment, particularly, illustrating signals related with resonance of the terahertz notch filter after a main pulse occurs. A terahertz pulse and spectrums with an air gap having a size of approximately 92 μm are illustrated in FIGS. 3A, 3B and 3C. A terahertz pulse and spectrums with an air gap having a size of approximately 105 μm are illustrated in FIGS. 3D, 3E and 3F. The terahertz pulses are illustrated in FIGS. 3A and 3D. The inner boxes in FIGS. 3A and 3D are enlarged graphs illustrating the terahertz pulses in a range from approximately 30 [psec] to approximately 60 [psec]. The spectrums of the terahertz pulses are illustrated in FIGS. 3B and 3E. FIGS. 3C and 3F are enlarged graphs illustrating absorbance spectrums in resonance ranges.

The resonance of the terahertz notch filter was very sharp in spectrum ranges, and terahertz signals were measured sufficiently for approximately 66 [psec] in time ranges. The sharpest signal occurred at the front of practical experiment data in the time ranges of FIGS. 3A and 3D is referred to as a main pulse. After the main pulses occurred, residue signals were continually measured. At this point, signals due to the resonance of the terahertz notch filter were detected by approximately 66 [psec]. The amplitudes of the signals at the point of 66 [psec] were decreased to approximately $1/210$ of the amplitudes of the main pulses. The spectrums of FIGS. 3B and 3E are obtained through zero padding conversion. Data of 66 [psec] is extended to 1320 ps through zero addition to a data end. When the size of the air gap is changed from approximately 92 μm to approximately 105 μm as illustrated in FIGS. 3C and 3F, a resonant frequency of the terahertz notch filter is shifted to a lower frequency region by approximately 0.168 THz (from approximately 1.519 THz with the air gap of approximately 92 μm to approximately 1.351 THz with the air gap of approximately 105 μm. Frequency tuning sensitivity (FTS) may be expressed using $\Delta f/\Delta g$. $\Delta f$ denotes a shift of a resonant frequency, and $\Delta g$ denotes a variation in an air gap.

Accordingly, the FTS of the terahertz notch filter is approximately 12.9 GHZ/μm, and thus, the terahertz notch filter may function as a tunable notch filter in a terahertz region. The FTS of the terahertz notch filter is higher by two levels than a value according to a typical method such as the Fabry-Perot resonance method and the Bragg resonance method.

Absorbance of the resonant frequencies is illustrated in FIGS. 3C and 3F. The arrows of FIGS. 3C and 3F denote a full width at half maximum (FWHM) of approximately 11 GHz and a full width at half maximum (FWHM) of approximately 12 GHz. Q factors (resonant frequencies divided by FWHM) are approximately 138 and approximately 113. Thus, a high Q factor and a fixed frequency or a resonant frequency are tunable.

Figure 4:
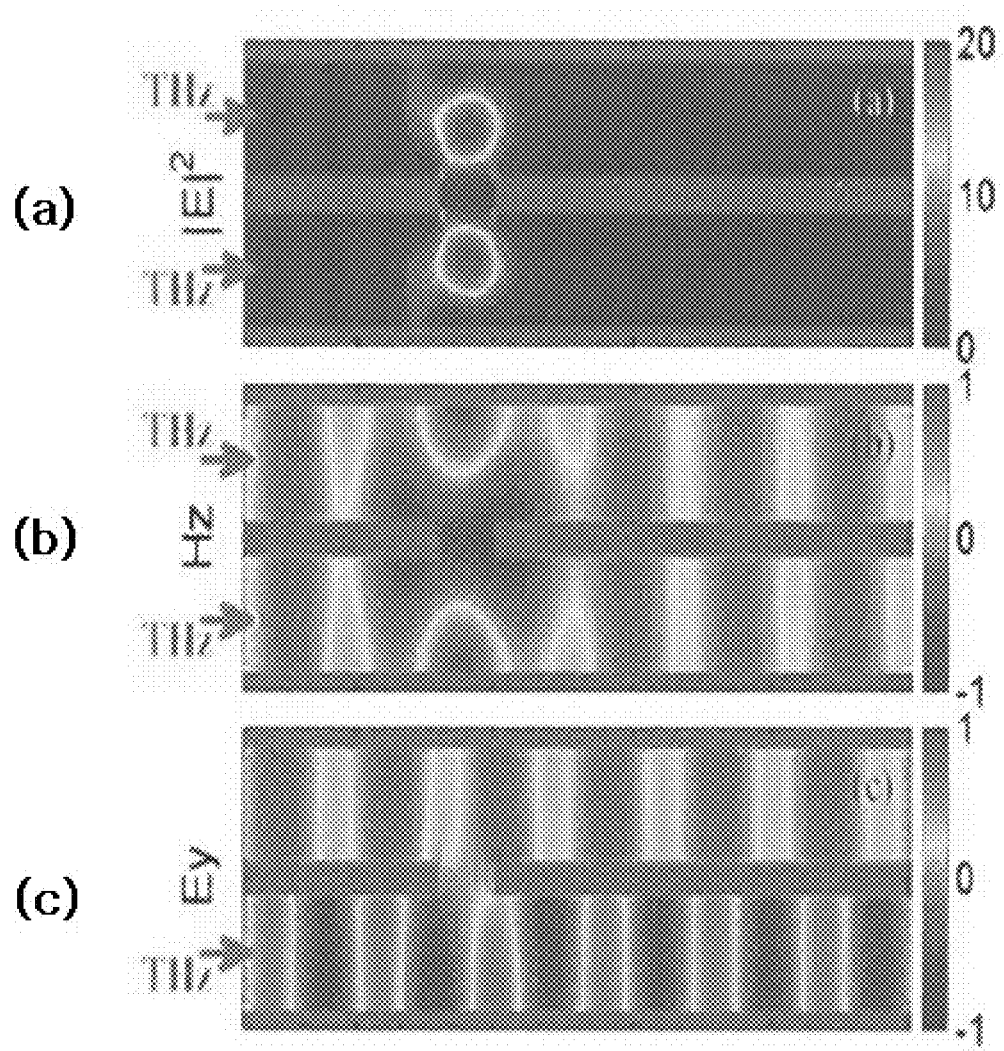
FIGS. 4A, 4B, and 4C are images illustrating simulation results according to a finite-difference time-domain (FDTD) method with a resonant frequency of approximately 1.519 THz and an air gap of approximately 92 μm, in accordance with an exemplary embodiment.

FIGS. 4A, 4B, and 4C are images illustrating simulation results according to a finite-difference time-domain (FDTD) method with a resonant frequency of approximately 1.519 THz and an air gap of approximately 92 μm, in accordance with an exemplary embodiment. The arrows of FIGS. 4A, 4B, and 4C denote incidence of terahertz waves to an air gap. An strength distribution of an electric field (E) is illustrated in FIG. 4A. A distribution of a z-direction magnetic field (Hz) is illustrated in FIG. 4B. A distribution of a y-direction electric field (Ey) is illustrated in FIG. 4C.

The simulation results of FIGS. 4A, 4B, and 4C are simulation results of a resonant frequency of a notch filter, that is, simulation results of a blocked frequency. The term 'block' denotes to prevent a terahertz wave incident in the direction of the arrows from the left side from propagating to the right side, so that the terahertz wave is not measured at the right side.

When terahertz beams propagate along air gaps disposed at the upper and lower sides of a slit formed of stainless steel, a distribution of electric field strength ($E^2$) is illustrated in FIG. 4A. The electric field is very localized at the upper and lower sides of the slit. There is no electric field in the air gaps behind the slit. Thus, an input 1.519-THz source is not measured in an output spectrum of the notch filter.

That is, the terahertz wave is incident from the left side to the upper and lower sides of the slit (in the directions of the arrows), and an incident pulse is blocked at the slit to form a strong electric field around the slit. In addition, there is no electric field behind the slit (no propagation).

The distribution of the z-direction magnetic field (Hz) illustrated in FIG. 4B is vertically symmetrical. When the sheet is disposed in the middle between an upper parallel surface and a lower parallel surface, the upper and lower sides of the sheet are symmetrical with each other, and thus, upper and lower fields of the sheet are symmetrical with each other. Thus, beams leaking from one gap to the other gap propagate in the same pattern.

The cause of the resonant frequency will now be described with reference to FIG. 4C. When the terahertz beam is incident to one of the upper and lower sides, propagation of the y-direction electric field is illustrated in FIG. 4C. Only the y-direction electric field along an Ey axis is illustrated to check a phase.

Upper and lower fields are opposite to each other in color (red/blue). This corresponds to a phase difference of 180° between + and − with respect to a sine curve. That is, when a terahertz beam propagating at the lower side of a sheet enters the upper side through a slit of the sheet, and then, propagates to the right side, a length variation of the terahertz beam is 180° in phase, and a half wavelength in length.

Thus, when the upper and lower sides of a slit are symmetrical with each other, and terahertz beams are incident to the upper and lower sides of the slit, fields are symmetrical with each other. In this case, a phase difference between a terahertz wave, which straightly propagates at the upper side, and a terahertz wave, which propagates from the lower side through the slit to the upper side and then to the right side, is 180°, and thus, the sum of the terahertz waves is close to zero. Accordingly, there is no terahertz wave behind the slit.

Figure 5:
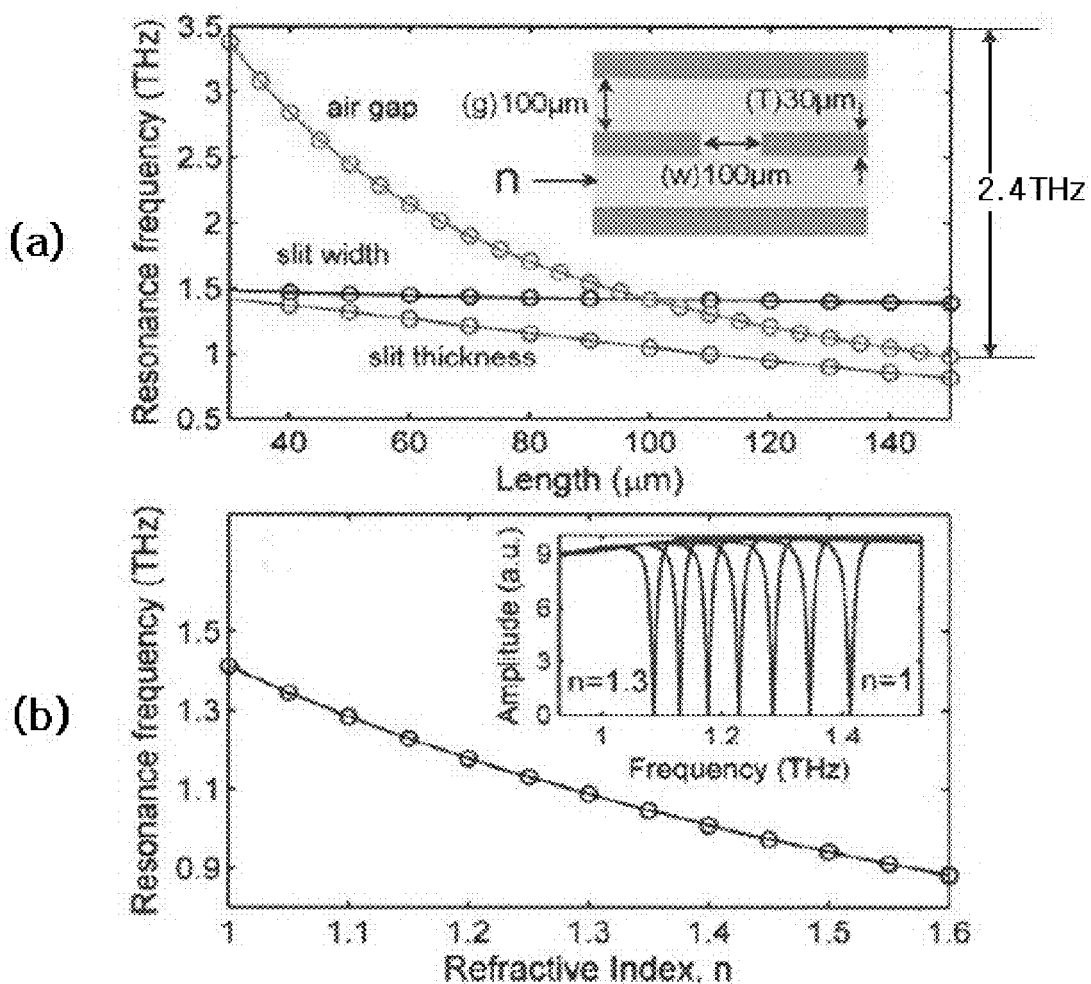
FIGS. 5A and 5B are FDTD simulation graphs illustrating a shift variation of a resonant frequency in accordance with an exemplary embodiment.

FIGS. 5A and 5B are FDTD simulation graphs illustrating a shift variation of a resonant frequency in accordance with an exemplary embodiment. A shift variation of a resonant frequency of a terahertz notch filter according to air gaps, slit thicknesses, and slit widths is illustrated in FIG. 5A. A shift variation of a resonant frequency of a terahertz notch filter according to refractive indices is illustrated in FIG. 5B.

The terahertz notch filter of FIG. 5A has an air gap g of approximately 100 μm, a slit width w of approximately 100 μm, and a slit thickness T of approximately 30 μm. The air gap is a space between a pair of metal plates in which air is present as a medium.

When the air gap g of approximately 100 μm, the slit width w of approximately 100 μm, and the slit thickness T of approximately 30 μm are varied from approximately 30 μm to approximately 150 μm, shift amounts of the resonant frequency are 2.4 THz, 0.09 THz, and 0.59 THz, respectively. Thus, the frequency tuning sensitivities (FTSs) according to the variations of the air gap g, the slit width w, and the slit thickness T are 20 GHz/μm, 0.75 GHz/μm, and 4.91 GHz/μm, respectively. As a result, although a phase shift of a terahertz wave sensitively depends on a slit width and a slit thickness, the phase shift most strongly depends on an air gap. Thus, a variation of an air gap most strongly affects the frequency tuning sensitivity (FTS), and the size of an air gap is in inverse proportional to the frequency tuning sensitivity (FTS).

When air gaps are slightly asymmetrical with each other, components are different in out-of-phase intensity, and thus, an amplitude at a terahertz notch filter decreases. A phase difference between a terahertz wave, which straightly propagates at one side of a sheet, and a terahertz wave, which propagates from the other side through a slit to the first side, is 180°, and thus, the sum of the terahertz waves is zero, thereby forming a resonant frequency of a notch filter. At this point, a frequency of the terahertz wave passing through the slit from the second side strongly depends on an air gap. Thus, when upper and lower gaps are asymmetrical with each other, the sum of terahertz waves is nonzero, and thus, an amplitude at a notch filter decreases.

The position of a notch filter with air gaps asymmetrical with each other more strongly depends on the greater gap than the smaller gap. A resonant frequency of a notch filter can be controlled by precisely adjusting an air gap.

Referring to FIG. 5B, as a refractive index is varied from 1 to 1.6, a resonant frequency is shifted from approximately 1.41 THz to approximately 0.88 THz. In this case, a channel of a waveguide is filled with gas having a high refractive index instead of air. $\Delta f/\Delta n$ (a refractive index variation), which denotes a mean frequency tuning sensitivity ($\Delta f$) according to a refractive index variation ($\Delta n$), is approximately 0.883 THz/RIU (RIU: Refractive Index Unit) that is greater than the latest value of the related art. The resonant frequency of FIG. 5B is obtained when the refractive index of an air gap is shifted from 1.0 to 1.3. The frequency tuning sensitivity (FTS) is most sensitive (1.36 THz/RIU) when the refractive index in a vacuum is 1. Thus, it makes it possible to distinguish air and gas, which is a very small portion of an air gap.

In the descriptions with FIGS. 2 to 5B, a sheet is disposed between two metal plates and is spaced apart therefrom, and a single slit is formed in the sheet, so that a terahertz notch filter can block a frequency in a specific band. Hereinafter, a terahertz low pass filter in accordance with another exemplary embodiment will now be described, in which a plurality of slits are continuously formed with constant periods in a sheet disposed between two metal plates and spaced apart therefrom, to pass terahertz waves in a low band.

Figure 6:
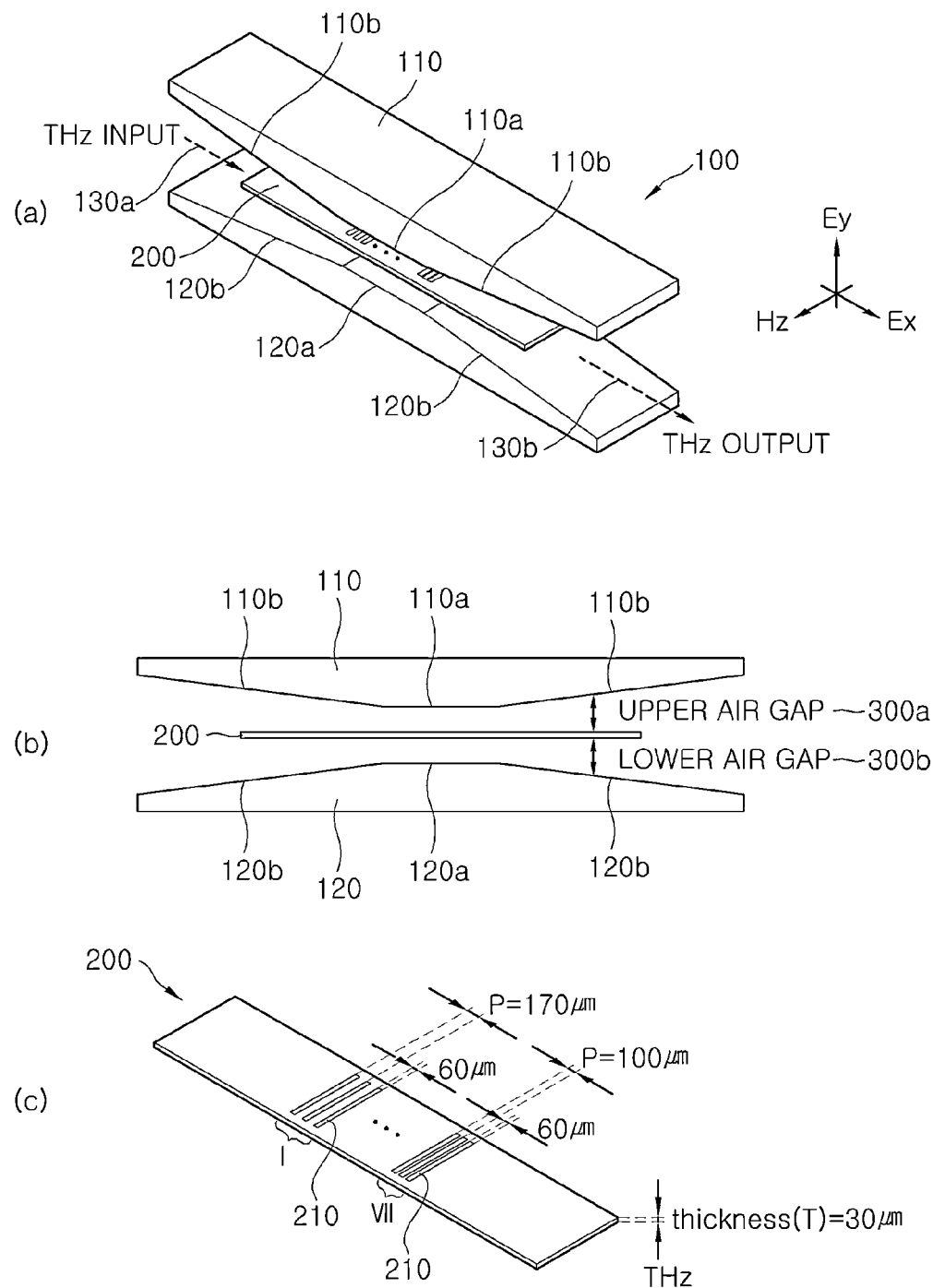
FIGS. 6A, 6B and 6C are views illustrating tapered parallel plate waveguides including a terahertz low pass filter in accordance with an exemplary embodiment.

FIG. 6A is a perspective view illustrating tapered parallel plate waveguides including a terahertz low pass filter in accordance with an exemplary embodiment. FIG. 6B is a side view illustrating the tapered parallel plate waveguides of FIG. 6A. FIG. 6C is a perspective view illustrating the terahertz low pass filter of FIG. 6A.

Unlike a terahertz notch filter, a terahertz low pass filter in accordance with the current embodiment includes a plurality of slits 210 formed with constant periods in a sheet 200, to pass terahertz waves in a low band. Thus, the sheet 200 is disposed between a pair of metal plates 110 and 120, is parallel thereto, and is spaced apart therefrom, and the slits 210 formed with constant periods in the sheet 200 have the same width.

The slits 210 are classified into groups according to periods, and the groups are arrayed in the longitudinal direction of the sheet 200. The groups have different slit periods P. Slip periods of slit groups I, II, III, IV, V, VI, and VII decrease in the longitudinal direction of the sheet 200.

In detail, a terahertz beam propagating along slits having a certain slit period within tapered parallel plate waveguides in accordance with the current embodiment has a Bragg stop band in which strong resonance occurs at a Bragg frequency (f(Bragg)=mc/2P, where m denotes is an integer, c denotes the speed of light, and P denotes a slip period). The width of the Bragg stop band increases in a high frequency region corresponding to a stop band of slits having a small period.

Figures 7, 8:
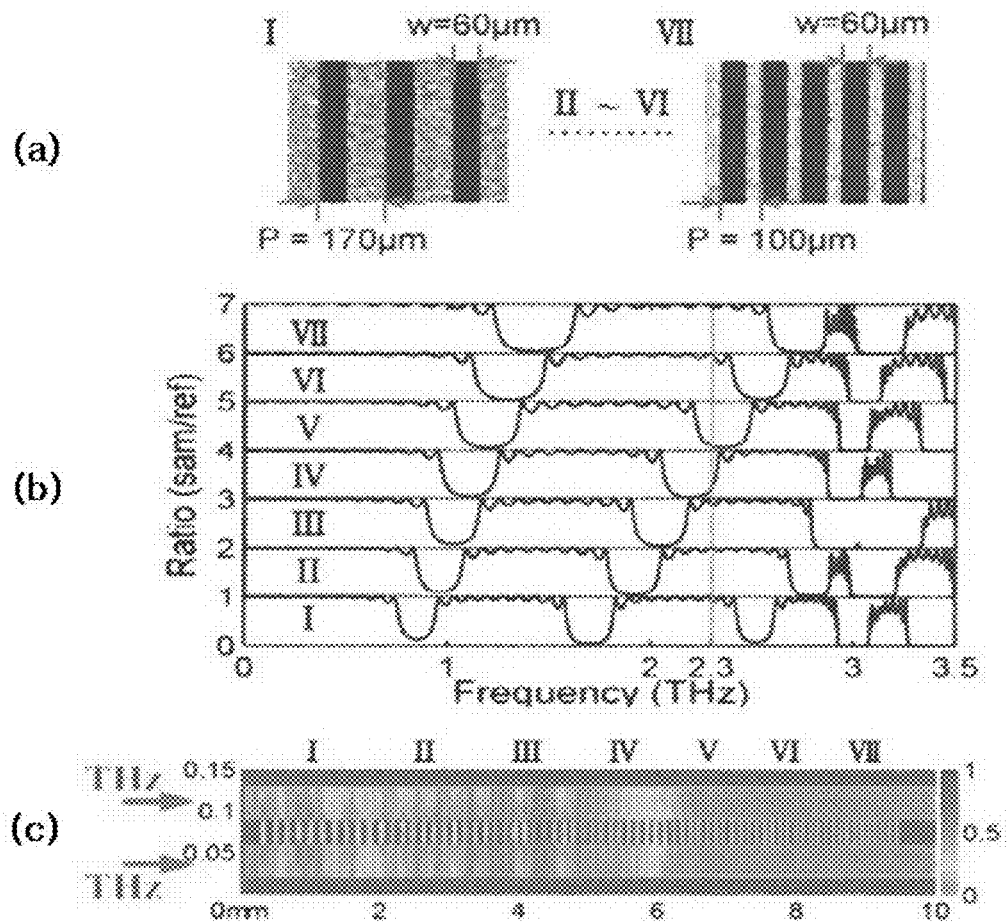
FIG. 7 is a table illustrating a plurality of slits classified into seven slit groups according to periods in accordance with an exemplary embodiment.

Thus, when slits 210 having different periods are straightly arrayed in the sheet 200, the terahertz low pass filter can completely eliminate high frequency components beyond a cut-off frequency. To this end, referring to FIG. 7, the slit groups I, II, III, IV, V, VI, and VII have the same width of approximately 60 μm, and the different slit periods P. Each group has identical ten slits, and thus, totally seventy slots are provided. That is, a plurality of slits having the same period constitute one slit group, and, seven slit groups have seventy slits.

FIGS. 8A, 8B, and 8C are views illustrating slits formed in a sheet and FDTD simulation results in accordance with an exemplary embodiment. Particularly, FIG. 8A is a view illustrating a part of slits formed in a first slit group I and a seventh slit group VII. FIG. 8B is a graph illustrating the position of a Bragg stop band in each slit group, in which a red line indicates 2.3 THz. FIG. 8C is an image illustrating FDTD simulation results about a strength distribution of an electric field (E) of a 2.3 THz-continuous wave source.

Referring to FIG. 8A, the slits formed in the first and seventh slit group I and VII are formed of stainless steel with a thickness of approximately 30 μm. FDTD simulation results about Bragg stop bands with an air gap of approximately 38 μm are illustrated in FIG. 8B. Referring to FIG. 8B, first and second Bragg resonant frequencies corresponding to the slits of the first slit group I are approximately 0.85 THz and approximately 1.7 THz, respectively. When being measured with a width of approximately 3 dB, the widths of the Bragg stop bands are approximately 0.19 THz and approximately 0.24 THz, respectively.

The first Bragg stop band of each of the seven slit groups I, II, III, IV, V, VI, and VII overlaps the first Bragg stop band of the previous slit group and/or the subsequent slit group. Furthermore, the first Bragg stop band of the first slit group I (from approximately 1.23 THz to approximately 1.62 THz) overlaps the second Bragg stop band of the seventh slit group VII (from approximately 1.58 THz to approximately 1.82 THz).

A THz field in a frequency region equal to or less than the first Bragg stop band of the first slit group I may propagate to an inlet of a waveguide. Thus, the characteristics of a low pass filter (LPF) are affected by the position of the first Bragg stop band of the first slit group I.

It can be predicted that the low pass filter has a cut-off frequency of approximately 0.76 THz, a power transmission of approximately 55 dB in a cut-off region, and a conversion width of approximately 84 GHz (drop from approximately 90% to approximately 10%) in the cut-off region. This specific THz component propagation is checked by performing an FDTD simulation with a THz continuous wave source.

Referring to FIG. 8B, the 2.3 THz continuous wave source depicted with the red line propagates through the first, second, and third slit groups I, II, and III. However, the Bragg stop band of the fourth slit group IV including the frequency of 2.3 THz blocks the propagation of a terahertz wave along the air gap. Referring to FIG. 8C, a simulation is performed with an air gap of approximately 38 μm, and a 2.3 THz continuous wave source, and the fourth slit group IV blocks the propagation of a terahertz wave in a high frequency region.

Figure 9:
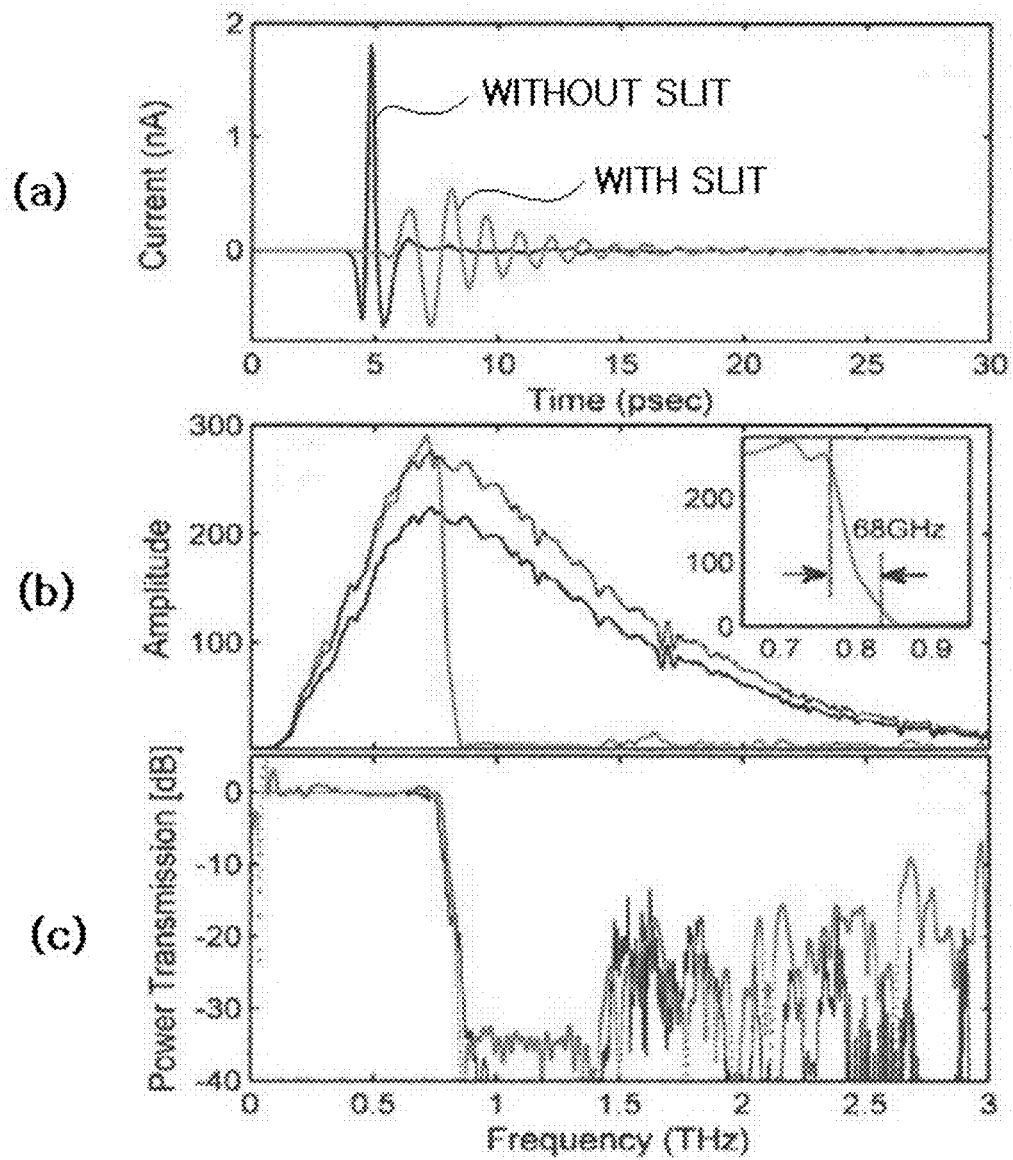
FIG. 9A is a graph illustrating output of a reference terahertz pulse measured at a sheet having no slit, and a slit terahertz pulse measured at a sheet having a slit, in accordance with an exemplary embodiment.
FIG. 9B is a graph illustrating amplitudes of the reference terahertz pulse and the slit terahertz pulse of FIG. 9A.
FIG. 9C is a graph illustrating power transmission of the reference terahertz pulse and the slit terahertz pulse of FIG. 9A.

FIG. 9A is a graph illustrating output of a reference terahertz pulse measured at a sheet having no slit, and a slit terahertz pulse measured at a sheet having a slit, in accordance with an exemplary embodiment. FIG. 9B is a graph illustrating amplitudes of the reference terahertz pulse and the slit terahertz pulse of FIG. 9A. FIG. 9C is a graph illustrating power transmission of the reference terahertz pulse and the slit terahertz pulse of FIG. 9A.

Referring to FIG. 9A, a terahertz pulse depicted with black line, which is referred to as a reference terahertz pulse, is measured at a stainless steel sheet having no slit with an air gap of approximately 38 μm. The sheet has a thickness of approximately 30 μm. In addition, a terahertz pulse depicted with red line, which is referred to as a slit terahertz pulse, is measured at a stainless steel sheet having a slit with an air gap of approximately 38 μm. The sheet has a thickness of approximately 30 μm.

The oscillation of the slit terahertz pulse is greater than that of the reference terahertz pulse. Accordingly, it can be assumed that the number of low frequency components of the slit terahertz pulse is greater than the number of low frequency components of the reference terahertz pulse. Furthermore, when passing through the slit, the slit terahertz pulse is delayed due to a group delay, relative to the reference terahertz pulse. Spectrums of the slit and reference terahertz pulses are illustrated in FIG. 9B. The amplitude of the spectrum (red) of the slit terahertz pulse is blocked at approximately 0.78 THz, which corresponds with the simulation result of FIG. 8B.

Referring to FIG. 9B, a magnitude response varies from a pass band to a stop band. A transition band is approximately 68 GHz. The amplitude of the spectrum of the slit terahertz pulse is greater than that of the spectrum of the reference terahertz pulse. Due to one large air gap (38 μm+30 μm+38 μm=106 μm) between metal plates of two waveguides having attenuation smaller than the two air gaps of approximately 38 μm, allowable transmission loss in a simulation about a total slit width of approximately 4200 μm is small. Thus, the power transmission illustrated in FIG. 9C is determined through numerical modification of the amplitude of the reference terahertz pulse depicted with dotted line in FIG. 9B. Power transmission in a cut-off region of a low pass filter is approximately 35 dB as depicted with red line. An experimental result corresponds with an FDTD simulation result depicted with black line in FIG. 9C.

The experimental results of the above embodiments are based on the designed slit lengths and the designed slit widths. However, in another exemplary embodiment, a gap of tapered parallel plate waveguides, and a mode of a propagating terahertz wave may be varied. That is, conditions such as a waveguide gap and a terahertz wave mode may be varied in accordance with an exemplary embodiment.

In accordance with the embodiments, since a sheet having a single slit is disposed between a pair of metal plates, and is parallel thereto, terahertz waves propagating through tapered parallel plate waveguides are blocked in a specific frequency band. In addition, since a plurality of slits are periodically between a pair of metal plates, terahertz waves propagating through tapered parallel plate waveguides are passed in a low frequency band. In addition, gaps between a sheet and parallel surfaces of metal plates are adjusted to control a stop frequency band, and the refractive index of a medium between the sheet and the parallel surfaces is varied to control the stop frequency band.

Although the terahertz band filter has been described with reference to the specific exemplary embodiments, it is not limited thereto. Therefore, it will be readily understood by those skilled in the art that various modifications and changes can be made thereto without departing from the spirit and scope of the present invention defined by the appended claims.

What is claimed is:

1. A terahertz band filter for filtering, in a frequency band, a terahertz wave propagating between a pair of metal plates with an upper parallel surface facing a lower parallel surface, the terahertz band filter comprising:
    a sheet parallel to the upper and lower parallel surfaces, which is disposed between the metal plates and is spaced apart therefrom; and
    a slit located in the sheet facing the upper and lower parallel surfaces, and
    wherein:
        the slit is formed only in a direction perpendicular to a longitudinal axis of the sheet;
        a length and a width of the slit are varied to control a resonant frequency of a notch filter; and
        the slit is the only slit in the sheet and is configured to function as a notch filter for blocking in a specific frequency band.

2. The terahertz band filter of claim 1, wherein
    the pair of metal plates comprises an upper metal plate and a lower metal plate,
    each of the upper metal plate and the lower metal plate includes a parallel surface, an input end coupled to one end in a longitudinal axis of the parallel surface to form a slope, and an output end coupled to the other end in a longitudinal axis of the parallel surface to form a slope, and
    a distance between the slope of the upper metal plate and the slope of the lower metal plate is gradually reduced to one end or the other end of the parallel surface.

3. The terahertz band filter of claim 2, wherein the sheet is disposed in a space between the metal plates and has an extended length such that the sheet is disposed between the slopes of the upper metal plate and the slopes of the lower metal plate.

4. The terahertz band filter of claim 1, wherein the sheet is formed of a metal.

5. The terahertz band filter of claim 1, wherein the single slit is disposed facing a central portion of the upper and lower parallel surfaces.

6. The terahertz band filter of claim 1, wherein the sheet is disposed in a middle portion between the upper and lower parallel surfaces.

7. The terahertz band filter of claim 6, wherein an air gap distance between the parallel surface and the sheet is varied to control the resonant frequency of the notch filter.

8. The terahertz band filter of claim 1, wherein the sheet is disposed closer to either the upper parallel surface or the lower parallel surface.

9. The terahertz band filter of claim 1, wherein a refractive index of a medium between the upper and lower parallel surfaces is varied to control the resonant frequency of the notch filter.

* * * * *